J. H. RUTHERFORD & W. J. ALFORD.
CAR WHEEL.
APPLICATION FILED JUNE 6, 1907.
901,650.
Patented Oct. 20, 1908.
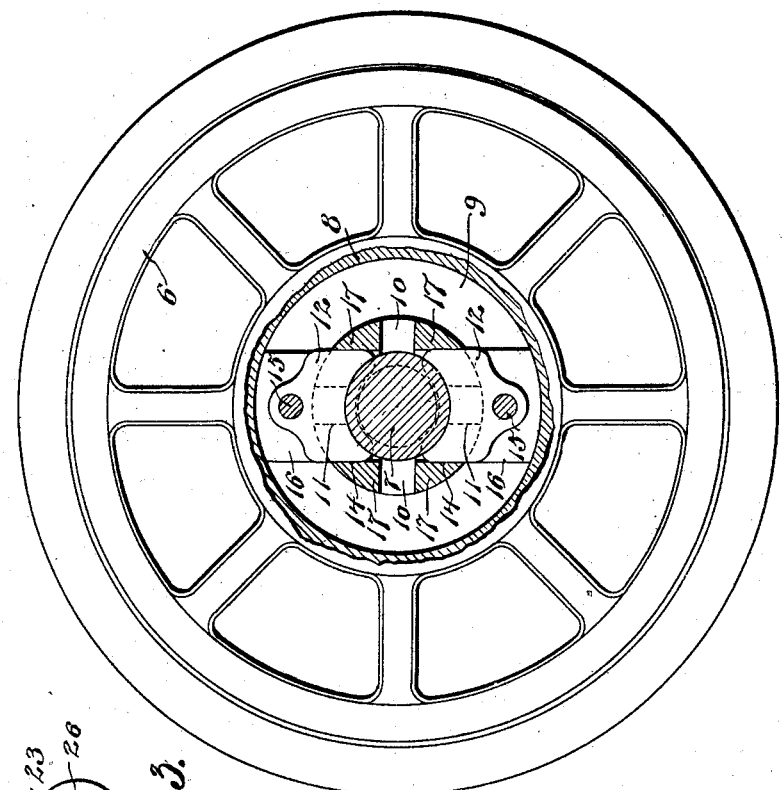
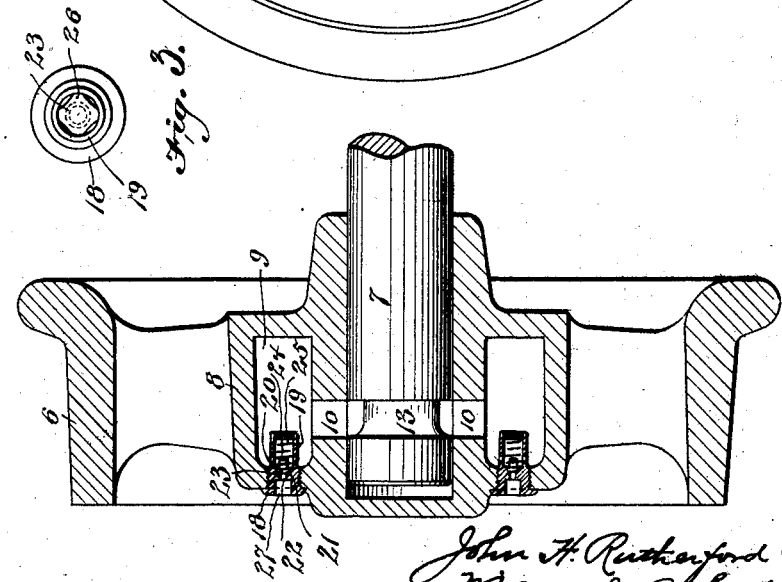

UNITED STATES PATENT OFFICE.

JOHN H. RUTHERFORD AND WILLIAM J. ALFORD, OF KNOXVILLE, TENNESSEE.

CAR-WHEEL.

No. 901,650.　　　　Specification of Letters Patent.　　　　Patented Oct. 20, 1908.

Application filed June 6, 1907. Serial No. 377,560.

*To all whom it may concern:*

Be it known that we, JOHN H. RUTHERFORD and WILLIAM J. ALFORD, citizens of the United States, residing at Knoxville, in the county of Knox and State of Tennessee, have invented certain new and useful Improvements in Car-Wheels, of which the following is a specification.

This invention relates to car-wheels and has for its object to provide an improved lubricating device therefor.

Figure 1 is a sectional view showing the application of the invention. Fig. 2 is a front elevation of the car-wheel partly in sections. Fig. 3 is an end view of the oiling device hereinafter referred to.

Referring specifically to the drawing, 6 denotes a car-wheel; and 7, the axle thereof. The hub 8 of the wheel is closed at its outer end and also is hollow to form an oil-chamber or reservoir 9 which communicates with the central bore of the hub by ducts 10 near the front end and ducts 11 near the rear end thereof.

The wheel is locked on the axle by means of keys 12 which are mounted inside the hub and seat at one end in a groove 13 made in the axle near its end. At its opposite ends the keys extend into the oil-chamber 9. That portion of the hub which is next to the axle has recesses 14 in line with the groove 13 through which the keys pass. The keys are secured by means of bolts 15 which pass through the front end-wall of the hub and through openings in the outer ends of the keys and screw into partitions 16 formed in the oil-chamber 9. In said chamber are also stops 17 between which the keys fit and which are for the purpose of preventing lateral displacement thereof. Two of the keys herein described are employed, they engaging the groove 13 at diametrically opposite points.

The manner in which the keys are mounted prevents friction on the axle and therefore adds to the life thereof, and a light running wheel is had.

Oil is introduced into the chamber 9 through valves mounted in the front end-wall of the hub. Two of such valves are employed, they being located at diametrically opposite points on the hub. Each valve comprises a plug 18 which is threaded on the outside to screw into a threaded opening in the front end-wall of the hub. From the inner end of the plug projects a cage 19 having outlets 20, and on said end of the plug, inside the cage, is a valve-seat 21 which communicates with a hole 22 passing to the outside of the plug. The valve 23 has a head which is shaped to fit the seat and when the valve is seated the hole 22 is closed. The valve has a stem 24 around which a spring 25 is coiled which serves to normally hold the valve to its seat. The spring bears at one end on the valve and at the opposite end on a bearing-plate 26 at the outer end of the cage. The bearing-plate is removably secured to the cage in order that the valve and its closing-spring may be placed in position. Oil is introduced into the chamber 9 by pushing the valve off its seat. The oil passes through the outlets 20 into the chamber 9, and also escapes past the bearing-plate 26, a portion of its edges being spaced from the wall of the cage 19 for this purpose. Upon releasing the valve, it is automatically closed by its spring. In the outer end of the plug 18 is a wrench socket 27 in order that the parts may be readily put in place or removed.

The arrangement herein described enables the wheel to be readily lubricated in any position, and the oil will flow to all parts of the bearing and keeps them thoroughly lubricated. Dust, dirt etc. are effectually excluded by the oil valve.

We claim:

The combination with a wheel having an oil-chamber in its hub, of a valve comprising a hollow plug seating in the wall of the oil-chamber and having a valve seat, a cage projecting from the inner end of the plug into the oil-chamber and surrounding the valve seat, outlets in the walls of the cage, a bearing plate at the end of the cage having a portion of its edges spaced from the walls of the cage, a valve seating on the aforesaid seat and having a projecting stem, and a spring coiled around the valve stem and bearing at its ends on the valve head and on the bearing plate respectively.

In testimony whereof we affix our signatures, in presence of two witnesses.

JOHN H. RUTHERFORD.
　　　　WILLIAM J. ALFORD.

Witnesses:
　E. E. FROST,
　G. S. FROST.